United States Patent
Liu et al.

(10) Patent No.: US 10,818,307 B2
(45) Date of Patent: Oct. 27, 2020

(54) VOICE IMITATION METHOD AND APPARATUS, AND STORAGE MEDIUM UTILIZING CLOUD TO STORE, USE, DISCARD, AND SEND IMITATION VOICES

(71) Applicant: TENCENT TECHNOLOGY (SHENZHEN) COMPANY LIMITED, Shenzhen (CN)

(72) Inventors: Yuanyuan Liu, Shenzhen (CN); Guangjun Liu, Shenzhen (CN); Guoli Lu, Shenzhen (CN); Fen Fu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 210 days.

(21) Appl. No.: 15/868,599

(22) Filed: Jan. 11, 2018

(65) Prior Publication Data
US 2018/0137875 A1 May 17, 2018

Related U.S. Application Data

(63) Continuation of application No. PCT/CN2016/086229, filed on Jun. 17, 2016.

(30) Foreign Application Priority Data

Oct. 8, 2015 (CN) .......................... 2015 1 0644697

(51) Int. Cl.
*G10L 21/00* (2013.01)
*G06F 8/20* (2018.01)
(Continued)

(52) U.S. Cl.
CPC .......... *G10L 21/013* (2013.01); *G10L 21/003* (2013.01); *G10L 2021/0135* (2013.01); *H04L 67/1097* (2013.01)

(58) Field of Classification Search
CPC ......... G10L 21/00; G10L 19/008; G06F 8/20; G10H 1/125
(Continued)

(56) References Cited

U.S. PATENT DOCUMENTS

| 5,327,521 A | * | 7/1994 | Savic | .................... G10L 21/00 704/200 |
| 2004/0260544 A1 | * | 12/2004 | Kikumoto | .............. G10H 1/125 704/221 |

(Continued)

FOREIGN PATENT DOCUMENTS

| CN | 101004911 A | 7/2007 |
| CN | 101751922 A | 6/2010 |

(Continued)

OTHER PUBLICATIONS

Speech Communication 16 (1995) 153-164, Hideyuki Mizuno, Masanobu Abe, 1995.*
(Continued)

*Primary Examiner* — Farzad Kazeminezhad
(74) *Attorney, Agent, or Firm* — Anova Law Group, PLLC

(57) ABSTRACT

Method, apparatus, and storage medium for voice imitation are provided. The voice imitation method, includes: separately obtaining a training voice of a source user and training voices of a plurality of imitation users including a target user; determining, according to the training voice of the source user and a training voice of the target user, a conversion rule for converting the training voice of the source user into the training voice of the target user; collecting voice information of the source user; and converting the voice information of the source user into an imitation voice of the target user according to the conversion rule.

12 Claims, 5 Drawing Sheets

(51) Int. Cl.
*G10H 1/12* (2006.01)
*G10L 19/008* (2013.01)
*G10L 21/013* (2013.01)
*G10L 21/003* (2013.01)
*H04L 29/08* (2006.01)

(58) Field of Classification Search
USPC .................................................. 704/200, 221
See application file for complete search history.

(56) References Cited

U.S. PATENT DOCUMENTS

| | | | |
|---|---|---|---|
| 2008/0082320 | A1 | 4/2008 | Popa et al. |
| 2011/0268279 | A1* | 11/2011 | Ishikawa .............. G10L 19/008 381/22 |
| 2014/0047406 | A1* | 2/2014 | Lam .......................... G06F 8/20 717/104 |

FOREIGN PATENT DOCUMENTS

| | | |
|---|---|---|
| CN | 102693729 A | 9/2012 |
| CN | 104464725 A | 3/2015 |
| CN | 104766603 A | 7/2015 |
| KR | 20020049061 A | 6/2002 |

OTHER PUBLICATIONS

The World Intellectual Property Organization (WIPO) International Search Report for PCT/CN2016/086229 dated Sep. 14, 2016 8 Pages (including translation).

Zhao, Li; "Voice Signal Processing", Mar. 31, 2003 (Mar. 31, 2003), p. 187, and chapter 82, paragraph 2 29 pages (Chapter 8).

* cited by examiner

VOICE IMITATION METHOD AND APPARATUS, AND STORAGE MEDIUM UTILIZING CLOUD TO STORE, USE, DISCARD, AND SEND IMITATION VOICES

RELATED APPLICATIONS

The present disclosure is a continuation application of PCT Patent Application No. PCT/CN2016/086229, filed on Jun. 17, 2016, which claims priority to Chinese Patent Application No. 201510644697.0, entitled "VOICE IMITATION METHOD AND APPARATUS" filed on Oct. 8, 2015, all of which is incorporated herein by reference in their entirety.

FIELD OF THE TECHNOLOGY

The present disclosure generally relates to the field of voice technologies, and in particular, relates to a voice imitation method and apparatus.

BACKGROUND OF THE DISCLOSURE

An instant messenger, such as WeChat or QQ, may be used to record voice information of a user, change the recorded voice information into a voice with different timbres, and send the changed voice to another user. This allows more fun in the communication between users.

However, before using this voice changing function, a user needs to download a voice material package from a network server. Currently, few voice materials are provided in a commonly used instant messenger. This reduces enjoyment and entertaining effects, which cannot satisfy requirements from more users. In addition, storage of voice material packages downloaded into a mobile device is space-wasting. Further, in a commonly used instant messenger, when the recorded voice information is matched into the voice having different timbres, only one voice can be obtained from the recorded voice information using one voice material. The utilization rate of the voice material is low.

SUMMARY

An aspect of the present disclosure provides a voice imitation method, including: separately obtaining a training voice of a source user and training voices of a plurality of imitation users, the plurality of imitation users including a target user; determining, according to the training voice of the source user and a training voice of the target user, a conversion rule for converting the training voice of the source user into the training voice of the target user; collecting voice information of the source user; and converting the voice information of the source user into an imitation voice of the target user according to the conversion rule.

Another aspect of the present disclosure provides a voice imitation apparatus, including a memory, storing program instructions for a voice imitation method, and a processor, coupled to the memory and, when executing the program instructions, configured to: separately obtain a training voice of a source user and training voices of a plurality of imitation users including a target user; determine, according to the training voice of the source user and a training voice of the target user, a conversion rule for converting the training voice of the source user into the training voice of the target user; collect voice information of the source user; and convert the voice information of the source user into an imitation voice of the target user according to the conversion rule.

Another aspect of the present disclosure provides a non-transitory computer-readable storage medium containing computer-executable program instructions for, when executed by a processor, performing a voice imitation method. The method includes: separately obtaining a training voice of a source user and training voices of a plurality of imitation users including a target user; determining, according to the training voice of the source user and a training voice of the target user, a conversion rule for converting the training voice of the source user into the training voice of the target user; collecting voice information of the source user; and converting the voice information of the source user into an imitation voice of the target user according to the conversion rule.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The technical solutions in the embodiments of the present disclosure will be clearly and completely described in the following with reference to the accompanying drawings in the embodiments of the present disclosure. It is obvious that the embodiments to be described are only a part rather than all of the embodiments of the present disclosure. All other embodiments obtained by a person of ordinary skill in the art based on the embodiments of the present disclosure without creative efforts shall fall within the protection scope of the present disclosure.

For creating a voice with different timbres from voice information, a voice material package needs to be downloaded from a network server. To imitate the voices of more users, the network server needs to provide a great number of voice material packages. The voice material packages may be obtained by a voice conversion technology. During a voice conversion process, it is needed to extract a feature parameter in voice information, and perform voice conversion according to the extracted feature parameter. The feature parameter may include frequencies, bandwidths, and the like of a plurality of formants.

Embodiments of the present disclosure provide a voice imitation method, apparatus, and storage medium. From one source user, imitation voices of a plurality of imitation users may be obtained. This increases materials (or "source materials") of imitation voices and improve efficiency of establishing a voice material library.

Figure 1:
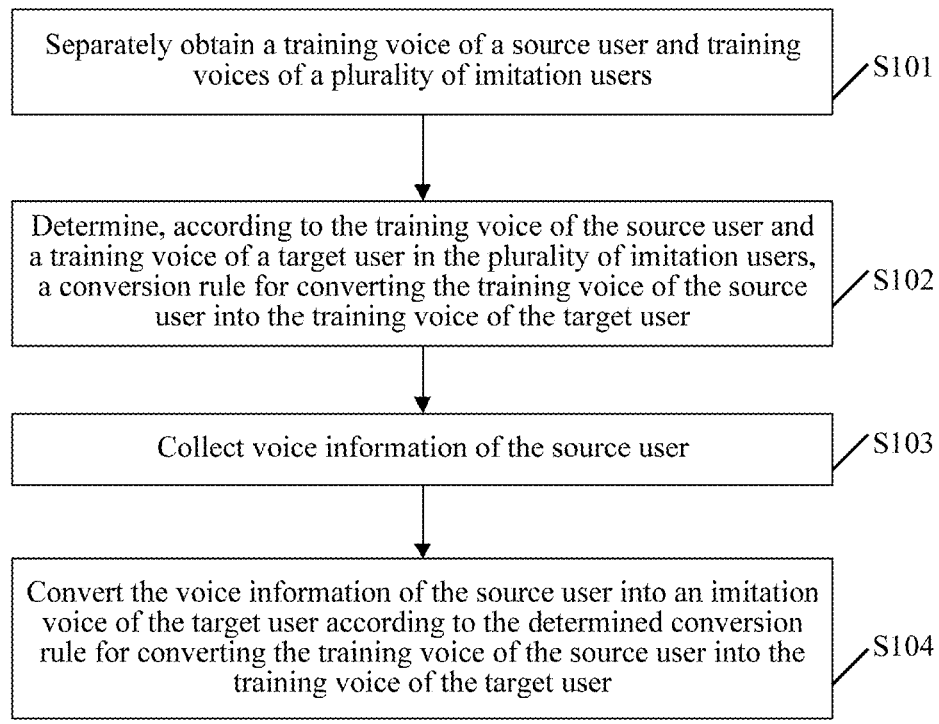
FIG. 1 is a flowchart of an exemplary voice imitation method according to various embodiment of the present disclosure.

FIG. 1 is a flowchart of an exemplary voice imitation method according to various embodiments of the present disclosure.

In S101: Separately obtaining a training voice of a source user and training voices of a plurality of imitation users. The plurality of imitation users may include a target user.

In one embodiment, a training voice of a source user may be recorded, and training voices of a plurality of imitation users may be downloaded from a network server. The plurality of imitation users may be any users such as animation or cartoon characters and celebrities, and the training voice may be a short piece of voice.

In S102: Determining, according to the training voice of the source user and a training voice of the target user in the plurality of imitation users, a conversion rule for converting the training voice of the source user into the training voice of the target user.

In one embodiment, the conversion rule includes a conversion matrix. A first feature parameter in the training voice of the source user and a second feature parameter in the training voice of the target user may be separately extracted, and a conversion matrix for converting the training voice of the source user into the training voice of the target user is determined according to the first feature parameter and the second feature parameter. The first feature parameter includes a bandwidth, a frequency, and the like of formant.

Further, preprocessing, such as end point detection and/or filtering, is separately performed on the training voice of the source user and the training voices of the plurality of imitation users, to obtain a data frame of the training voice of the source user and a data frame of a training voice of each imitation user among the plurality of imitation users. Then, according to the data frames, bandwidths and frequencies of first five formants of the training voice of the source user are extracted as the first feature parameter, and bandwidths and frequencies of first five formants of the training voice of each imitation user are extracted as the second feature parameter. Dynamic time warping and vector quantization are separately performed on the first feature parameter and the second feature parameter, and a conversion matrix from the first feature parameter to the second feature parameter is determined, so that the conversion matrix for converting the training voice of the source user into the training voice of the each imitation user can be obtained.

In S103: Collecting voice information of the source user.

In one embodiment, the voice information of the source user may be recorded, and to enable an imitation voice to satisfy voice imitation requirements of all users, the recorded voice information should include all common phrases, although some recorded voice information may possibly include less common phrases.

In S104: Converting the voice information of the source user into an imitation voice of the target user according to the determined conversion rule for converting the training voice of the source user into the training voice of the target user.

In one embodiment, a third feature parameter in the voice information of the source user may be extracted. A fourth feature parameter in voice information of the target user is determined according to the determined conversion matrix and the extracted third feature parameter. Synthesis is performed to obtain an imitation voice of the target user according to the fourth feature parameter in the voice information of the target user. Further, preprocessing, such as end point detection and/or filtering, is first performed on the voice information of the source user, to extract the third feature parameter in the voice information of the source user. Then, vector quantization is performed on the third feature parameter. According to the conversion matrix and the third feature parameter on which vector quantization has been performed, the fourth feature parameter is obtained by calculation, and the fourth feature parameter includes bandwidths and frequencies of a plurality of formants. A plurality of formant filters is constructed according to the bandwidths and frequencies of the plurality of formants in the voice information of the target user, an excitation signal sent from a preset excitation source is modulated using the plurality of constructed formant filters, and the modulated excitation signal is synthesized to obtain an imitation voice of the target user.

Figure 2:
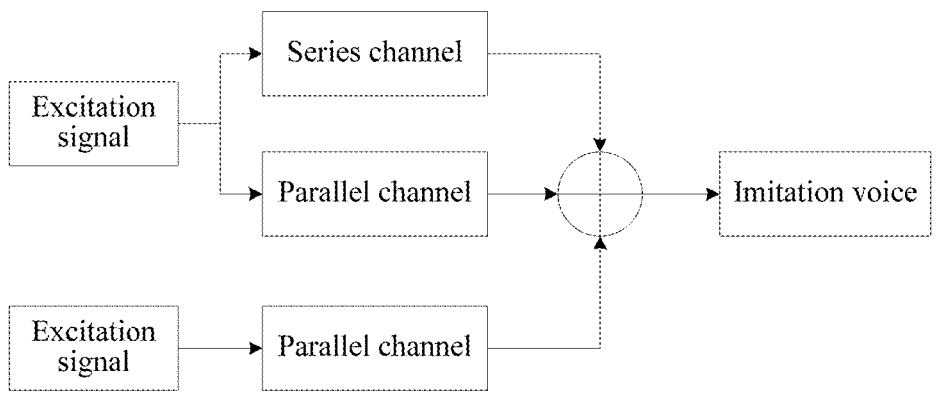
FIG. 2 is a schematic structural diagram of an exemplary voice synthesis according to an embodiment of the present disclosure.

Optionally, synthesis may be performed using the Linear Predictive Coding (LPC) synthesis technology and the Log Magnitude Approximate (LMA) vocal tract model to obtain an imitation voice of the target user. As shown in FIG. 2, in the formant synthesis technology, the imitation voice of the target user may be obtained by performing synthesis using a synthesis channel for the modulated excitation signal. The synthesis channel may be a parallel channel, a series channel, or a series-parallel channel.

Figure 3:
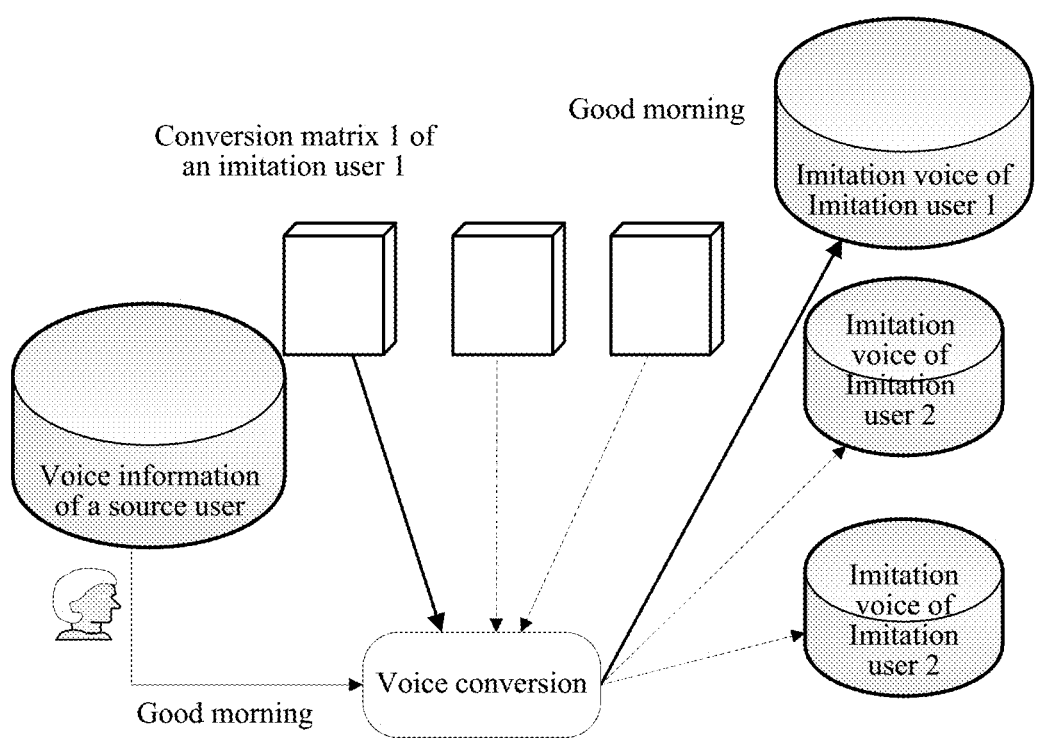
FIG. 3 is a schematic structural diagram of converting voice information of a source user into imitation voices of a plurality of imitation users according to an embodiment of the present disclosure.

For example, as shown in FIG. 3, a conversion matrix 1 converts a training voice of a source user into a training voice of an imitation user 1, a conversion matrix 2 converts the training voice of the source user into a training voice of an imitation user 2, and a conversion matrix 3 converts the training voice of the source user into a training voice of an imitation user 3. when voice information of the source user is "Good morning", after a series of processing of the conversion matrix 1, the conversion matrix 2, the conversion matrix 3, and the like are separately performed on the voice information, an imitation voice of "Good morning" of the imitation user 1, an imitation voice of "Good morning" of the imitation user 2, and an imitation voice of "Good morning" of the imitation user 3 may be obtained.

As disclosed, a training voice of a source user and training voices of a plurality of imitation users are first separately obtained; then, a conversion rule for converting the training voice of the source user into the training voice of the target user is determined according to the training voice of the source user and a training voice of a target user in the plurality of imitation users; voice information of the source user is collected; and the voice information of the source user is concerted into an imitation voice of the target user according to the determined conversion rule for converting the training voice of the source user into the training voice of the target user, so that imitation voices of a plurality of imitation user are imitated from a source user, materials of the imitation voices may be increased, and efficiency of establishing a voice material library may be improved.

Figure 4:
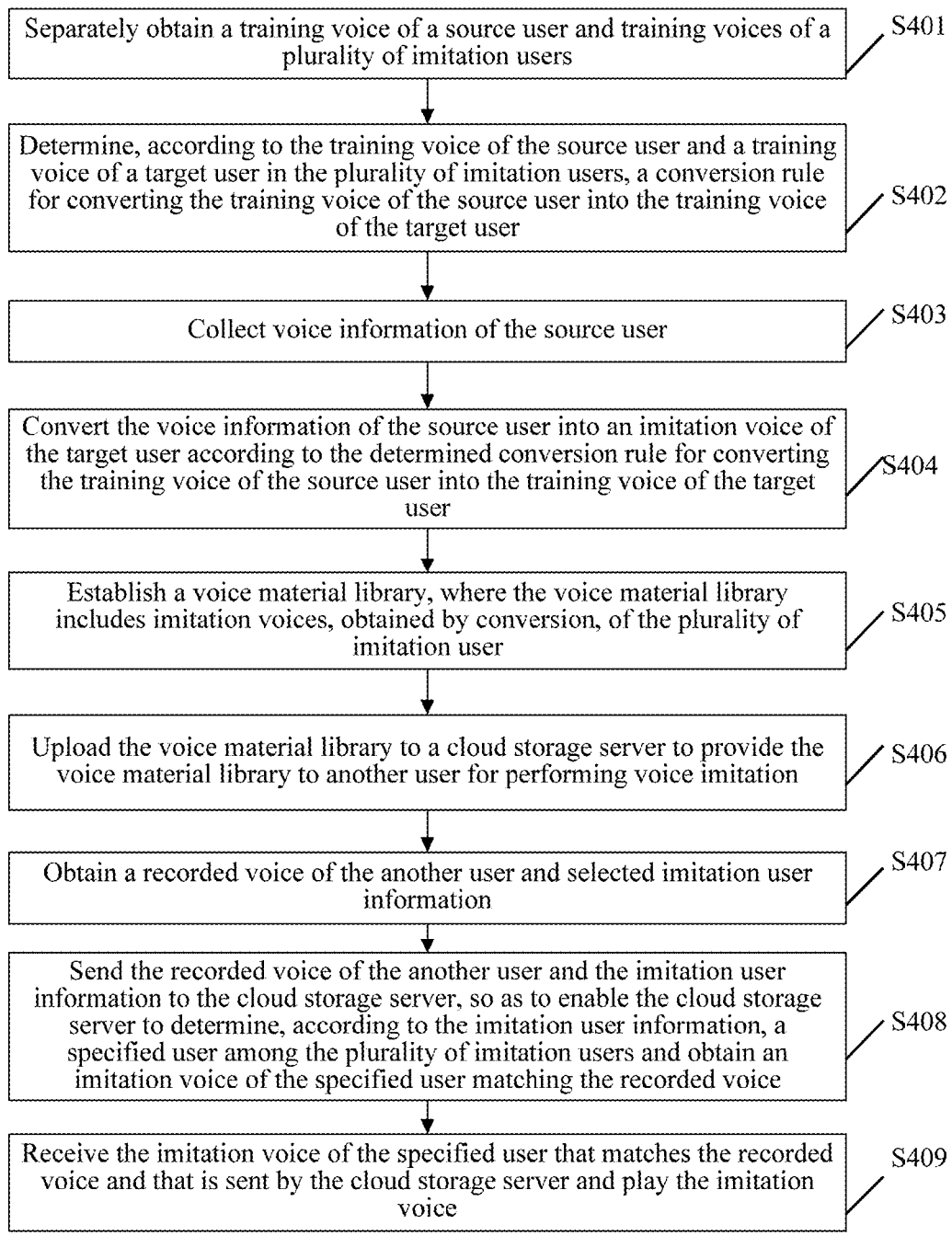
FIG. 4 is a flowchart of another exemplary voice imitation method according to various embodiments of the present disclosure.

FIG. 4 is a flowchart of another exemplary voice imitation method according to various embodiments of the present disclosure.

In S401: Separately obtaining a training voice of a source user and training voices of a plurality of imitation users.

In one embodiment, a training voice of a source user may be recorded, and training voices of a plurality of imitation users may be downloaded from a network server. The plurality of imitation users may be any users such as animation or cartoon characters and celebrities, and the training voice may be a short piece of voice.

In S402: Determining, according to the training voice of the source user and a training voice of a target user in the plurality of imitation users, a conversion rule for converting the training voice of the source user into the training voice of the target user.

In one embodiment, the conversion rule includes a conversion matrix. A first feature parameter in the training voice of the source user and a second feature parameter in the training voice of the target user may be separately extracted, and a conversion matrix for converting the training voice of the source user into the training voice of the target user is determined according to the first feature parameter and the second feature parameter.

Further, preprocessing, such as end point detection and/or filtering, is first separately performed on the training voice of the source user and the training voices of the plurality of imitation users, to obtain a data frame of the training voice of the source user and a data frame of a training voice of each imitation user among the plurality of imitation users. Then, according to the data frames, bandwidths and frequencies of first five formants of the training voice of the source user are extracted as the first feature parameter, and bandwidths and frequencies of first five formants of the training voice of each imitation user are extracted as the second feature parameter. Further, dynamic time warping (DTW) and vector quantization are separately performed on the first feature parameter and the second feature parameter, and a conversion matrix from the first feature parameter to the second feature parameter is determined, so that the conversion matrix for converting the training voice of the source user into the training voice of each imitation user can be obtained.

In S403: Collecting voice information of the source user.

In one embodiment, the voice information of the source user may be recorded, and to enable an imitation voice to satisfy voice imitation requirements of all users, the recorded voice information should include all common phrases, although some recorded voice information may possibly include less common phrases.

In S404: Converting the voice information of the source user into an imitation voice of the target user according to the determined conversion rule for converting the training voice of the source user into the training voice of the target user.

In one embodiment, a third feature parameter in the voice information of the source user may be extracted. A fourth feature parameter in voice information of the target user is determined according to the determined conversion matrix and the extracted third feature parameter. Synthesis is performed to obtain an imitation voice of the target user according to the fourth feature parameter in the voice information of the target user. Further, preprocessing, such as end point detection and/or filtering, is first performed on the voice information of the source user, to extract the third feature parameter in the voice information of the source user. Then, vector quantization is performed on the third feature parameter, according to the conversion matrix and the third feature parameter on which vector quantization has been performed, the fourth feature parameter is obtained by calculation, and the fourth feature parameter includes bandwidths and frequencies of a plurality of formants. A plurality of formant filters is constructed according to the bandwidths and frequencies of the plurality of formants in the voice information of the target user, an excitation signal sent from a preset excitation source is modulated using the plurality of constructed formant filters, and the modulated excitation signal is synthesized to obtain an imitation voice of the target user.

Optionally, synthesis may be performed using the Linear Predictive Coding (LPC) synthesis technology and the Log Magnitude Approximate (LMA) vocal tract model to obtain an imitation voice of the target user. As shown in FIG. 2, in the formant synthesis technology, the imitation voice of the target user may be obtained by performing synthesis using a synthesis channel for the modulated excitation signal. The synthesis channel may be a parallel channel, a series channel, or a series-parallel channel.

For example, as shown in FIG. 3, a conversion matrix 1 converts a training voice of a source user into a training voice of an imitation user 1, a conversion matrix 2 converts the training voice of the source user into a training voice of an imitation user 2, and a conversion matrix 3 converts the training voice of the source user into a training voice of an imitation user 3. when voice information of the source user is "Good morning", after a series of processing of the conversion matrix 1, the conversion matrix 2, the conversion matrix 3, and the like are separately performed on the voice information, an imitation voice of "Good morning" of the imitation user 1, an imitation voice of "Good morning" of the imitation user 2, and an imitation voice of "Good morning" of the imitation user 3 may be obtained.

In S405: Establishing a voice material library, where the voice material library includes imitation voices, obtained by conversion, of the plurality of imitation user. An imitation voice of an imitation user in the voice material library may be added according to voice imitation requirements of a user.

In S406: Uploading the voice material library to a cloud storage server to provide the voice material library to another user for performing voice imitation.

In one embodiment, an account and a password for accessing a cloud storage server may be first created, then, authentication is performed on the account and the password for logging in to the cloud storage server, and the voice material library is uploaded to the cloud storage server, so as to release storage space of the apparatus.

In S407: Obtaining a recorded voice of the another user and imitation user information selected by the another user. The imitation user information may be a name of a user object that is to be imitated.

In S408: Sending the recorded voice of the another user and the imitation user information to the cloud storage server, to enable the cloud storage server to determine, according to the imitation user information, a specified user among the plurality of imitation users and obtain an imitation voice of the specified user matching the recorded voice.

In one embodiment, after receiving recorded voice of the another user and the imitation user information selected by the another user, the cloud storage server first determines, according to imitation user information selected by the another user, a specified user that the another user wants to imitate among the plurality of imitation users, and then performs searches to determine whether an imitation voice of the specified user matching the recorded voice of the another user exists. If the imitation voice exists, the cloud storage server sends back the imitation voice of the specified user matching the recorded voice of the another user to the apparatus.

For example, another user obtains a recorded voice "Hello" using an instant messenger and selects an imitation user 1 as a to-be-imitated object. The apparatus sends the recorded voice "Hello" and imitation user information "Imitation user 1" to the cloud storage server. The cloud storage server determines, according to the imitation user information, that the user needs to imitate "Imitation user 1", searches for an imitation voice of "Imitation user 1" in the voice material library, and searches, according to the recorded voice "Hello", the imitation voice of "Imitation user 1" for "Hello", and sends "Hello" in the found imitation voice of the "Imitation user 1" back to the apparatus.

In Step 409: Receive the imitation voice of the specified user that matches the recorded voice and that is sent by the cloud storage server and play the imitation voice.

In one embodiment, after the imitation voice of the specified user that matches the recorded voice and that is sent by the cloud storage server is received, the imitation voice of the specified user matching the recorded voice may be first auditioned and tested. when the another user feels dissatisfied, the another user may abandon the imitation voice of the specified user, further select other imitation user information, and re-obtain an imitation voice of another imitation user found by the cloud storage server. When the another user feels satisfied, the another user may send the imitation voice of the specified user to the other party of a call, to increase interest and enjoyment in communications.

As disclosed, a training voice of a source user and training voices of a plurality of imitation users are first separately obtained; then, a conversion rule for converting the training voice of the source user into the training voice of the target user is determined according to the training voice of the source user and a training voice of a target user in the plurality of imitation users; voice information of the source user is collected; and the voice information of the source user is concerted into an imitation voice of the target user according to the determined conversion rule for converting the training voice of the source user into the training voice of the target user, imitation voices, obtained by conversion, of the plurality of imitation users are uploaded to a cloud storage server, and voice imitation is performed by using a voice material package provided by the cloud storage server. As such, imitation voices of a plurality of imitation user may be imitated from a source user, materials of the imitation voices may be increased, and efficiency of establishing a voice material library may be improved. In addition, memory occupation of a mobile device is reduced.

Figure 5:
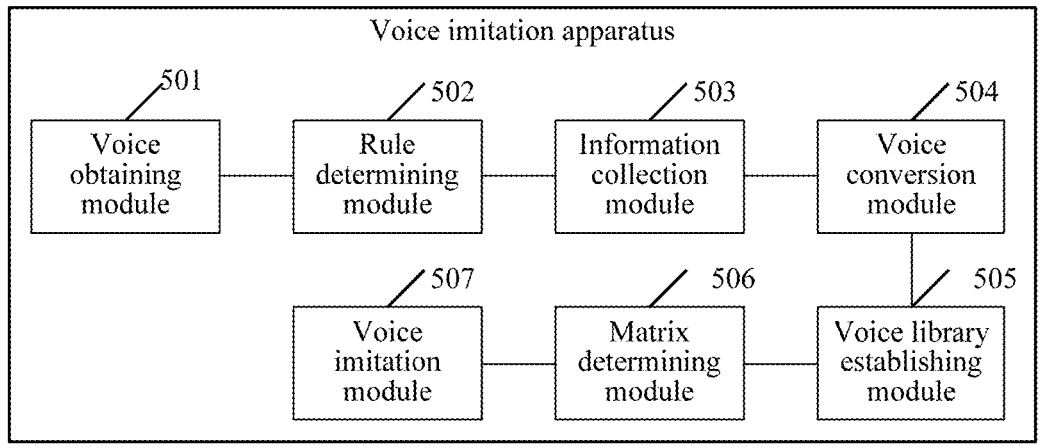
FIG. 5 is a schematic structural diagram of an exemplary voice imitation apparatus according to an embodiment of the present disclosure.

FIG. 5 is a schematic structural diagram of an exemplary voice imitation apparatus according to an embodiment of the present disclosure.

A voice obtaining device 501 is configured to separately obtain a training voice of a source user and training voices of a plurality of imitation users.

In one embodiment, a training voice of a source user may be recorded, and training voices of a plurality of imitation users may be downloaded from a network server. The plurality of imitation users may be any users such as animation or cartoon characters and celebrities, and the training voice may be a short piece of voice.

A rule determining device 502 is configured to determine, according to the training voice of the source user and a training voice of a target user in the plurality of imitation users, a conversion rule for converting the training voice of the source user into the training voice of the target user.

Figure 6:
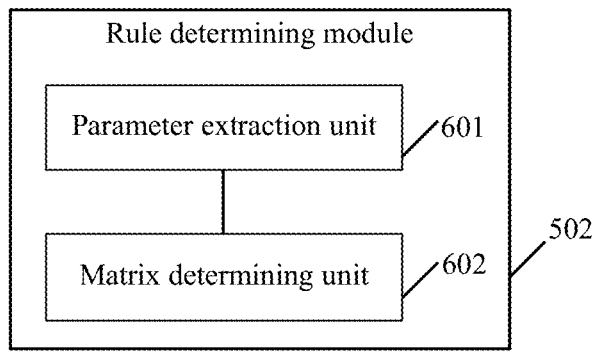
FIG. 6 is a schematic structural diagram of a rule determining device in an exemplary voice imitation apparatus according to an embodiment of the present disclosure.

In one embodiment, as shown in FIG. 6, the rule determining device 502 may further include the following.

A parameter extractor 601 is configured to separately extract a first feature parameter in the training voice of the source user and a second feature parameter in the training voice of the target user. The first feature parameter includes a bandwidth, a frequency, and the like of a formant. For example, preprocessing, such as end point detection and/or filtering, is first separately performed on the training voice of the source user and the training voices of the plurality of imitation users, to obtain a data frame of the training voice of the source user and a data frame of a training voice of each imitation user among the plurality of imitation users. Then, according to the data frames, bandwidths and frequencies of first five formants of the training voice of the source user are extracted as the first feature parameter, and bandwidths and frequencies of first five formants of the training voice of each imitation user are extracted as the second feature parameter.

A matrix determining device 602 is configured to determine, according to the first feature parameter and the second feature parameter, a conversion matrix for converting the training voice of the source user into the training voice of the target user.

For example, dynamic time warping and vector quantization are separately performed on the first feature parameter and the second feature parameter, and a conversion matrix from the first feature parameter to the second feature parameter is determined, so that the conversion matrix for converting the training voice of the source user into the training voice of the each imitation user can be obtained.

An information collection device 503 is configured to collect voice information of the source user.

In one embodiment, the voice information of the source user may be recorded, and to enable an imitation voice to satisfy voice imitation requirements of all users, the recorded voice information should include all common phrases, although some recorded voice information may possibly include less common phrases.

A voice conversion device 504 is configured to convert the voice information of the source user into an imitation voice of the target user according to the determined conversion rule for converting the training voice of the source user into the training voice of the target user.

Figure 7:
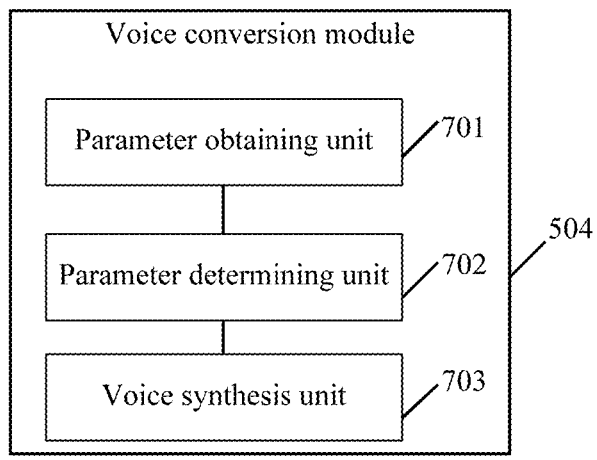
FIG. 7 is a schematic structural diagram of a voice conversion device in an exemplary voice imitation apparatus according to an embodiment of the present disclosure.

In one embodiment, as shown in FIG. 7, the voice conversion device 504 may further include the following.

A parameter obtaining device 701 is configured to extract a third feature parameter in the voice information of the source user. For example, preprocessing, such as end point detection and/or filtering, is first performed on the voice information of the source user, to extract the third feature parameter in the voice information of the source user.

A parameter determining device 702 is configured to determine a fourth feature parameter in voice information of the target user according to the determined conversion matrix and the extracted third feature parameter.

For example, vector quantization may be performed on the third feature parameter, according to the conversion matrix and the third feature parameter on which vector quantization has been performed, the fourth feature parameter is obtained by calculation, and the fourth feature parameter includes bandwidths and frequencies of a plurality of formants.

A voice synthesis device 703 is configured to perform synthesis to obtain an imitation voice of the target user according to the fourth feature parameter in the voice information of the target user.

For example, a plurality of formant filters may be first constructed according to the bandwidths and frequencies of the plurality of formants in the voice information of the target user, then, an excitation signal sent from a preset excitation source is modulated using the plurality of constructed formant filters, and the modulated excitation signal is synthesized to obtain an imitation voice of the target user.

Optionally, synthesis may be performed using the Linear Predictive Coding (LPC) synthesis technology and the Log Magnitude Approximate (LMA) vocal tract model to obtain an imitation voice of the target user. As shown in FIG. 2, in the formant synthesis technology, the imitation voice of the target user may be obtained by performing synthesis using a synthesis channel using the modulated excitation signal. The synthesis channel may be a parallel channel, a series channel, or a series-parallel channel.

For example, as shown in FIG. 3, a conversion matrix 1 converts a training voice of a source user into a training voice of an imitation user 1, a conversion matrix 2 converts the training voice of the source user into a training voice of an imitation user 2, and a conversion matrix 3 converts the training voice of the source user into a training voice of an imitation user 3. when voice information of the source user is "Good morning", after a series of processing of the conversion matrix 1, the conversion matrix 2, the conversion matrix 3, and the like are separately performed on the voice information, an imitation voice of "Good morning" of the imitation user 1, an imitation voice of "Good morning" of the imitation user 2, and an imitation voice of "Good morning" of the imitation user 3 may be obtained.

Optionally, as shown in FIG. 5, the exemplary apparatus in the present disclosure may further include the following.

A voice library establishing device 505 is configured to establish a voice material library, where the voice material library includes imitation voices, obtained by conversion, of the plurality of imitation user. An imitation voice of an imitation user in the voice material library may be added according to voice imitation requirements of a user.

A voice library uploading device 506 is configured to upload the voice material library to a cloud storage server to provide the voice material library to another user for performing voice imitation.

In one embodiment, an account and a password for accessing a cloud storage server may be first created, then, authentication is performed on the account and the password for logging in to the cloud storage server, and the voice material library is uploaded to the cloud storage server, so as to release storage space of the apparatus.

Optionally, as shown in FIG. 5, the exemplary apparatus in the present disclosure may further include the following.

A voice imitation device 507 is configured to: obtain a recorded voice of the another user and imitation user information selected by the another user; send the recorded voice of the another user and the imitation user information to the cloud storage server, so as to enable the cloud storage server to determine, according to the imitation user information, a specified user among the plurality of imitation users and obtain an imitation voice of the specified user matching the recorded voice; and receive the imitation voice of the specified user that matches the recorded voice and that is sent by the cloud storage server and play the imitation voice.

In one embodiment, imitation user information may be a name of a user object that is to be imitated. After receiving recorded voice of the another user and the imitation user information, the cloud storage server first determines, according to imitation user information selected by the another user, a specified user that the another user needs to imitate among the plurality of imitation users, and then performs searches to determine whether an imitation voice of the specified user matching the recorded voice of the another user exists, and when the imitation voice exists, sends back the imitation voice of the specified user matching the recorded voice of the another user to the apparatus. After the imitation voice of the specified user that matches the recorded voice and that is sent by the cloud storage server is received, the imitation voice of the specified user matching the recorded voice may be first auditioned and tested. When the another user feels dissatisfied, the another user may abandon the imitation voice of the specified user, further select other imitation user information, and re-obtain an imitation voice of another imitation user found by the cloud storage server. When the another user feels satisfied, the another user may send the imitation voice of the specified user to the other party of a call, so as to increase interest in communication.

For example, another user obtains a recorded voice "Hello" using an instant messenger and selects an imitation user 1 as a to-be-imitated object. The apparatus sends the recorded voice "Hello" and imitation user information "Imitation user 1" to the cloud storage server. The cloud storage server determines, according to the imitation user information, that the user needs to imitate "Imitation user 1", therefore, searches for an imitation voice of "Imitation user 1" in the voice material library, and finally, searches, according to the recorded voice "Hello", the imitation voice of "Imitation user 1" for "Hello", and sends "Hello" in the found imitation voice of the "Imitation user 1" back to the apparatus. The apparatus may play "Hello" in the imitation voice of "Imitation user 1" by using an instant messenger such as QQ or WeChat.

As disclosed, a training voice of a source user and training voices of a plurality of imitation users are first separately obtained; then, a conversion rule for converting the training voice of the source user into the training voice of the target user is determined according to the training voice of the source user and a training voice of a target user in the plurality of imitation users; voice information of the source user is collected; and finally, the voice information of the source user is concerted into an imitation voice of the target user according to the determined conversion rule for converting the training voice of the source user into the training voice of the target user, imitation voices, obtained by conversion, of the plurality of imitation users are uploaded to a cloud storage server, and voice imitation is performed by using a voice material package provided by the cloud storage server.

As such, imitation voices of a plurality of imitation user may be imitated from a source user, materials of the imitation voices may be increased, and efficiency of establishing a voice material library may be improved. In addition, memory occupation of a mobile device is reduced.

Figure 8:
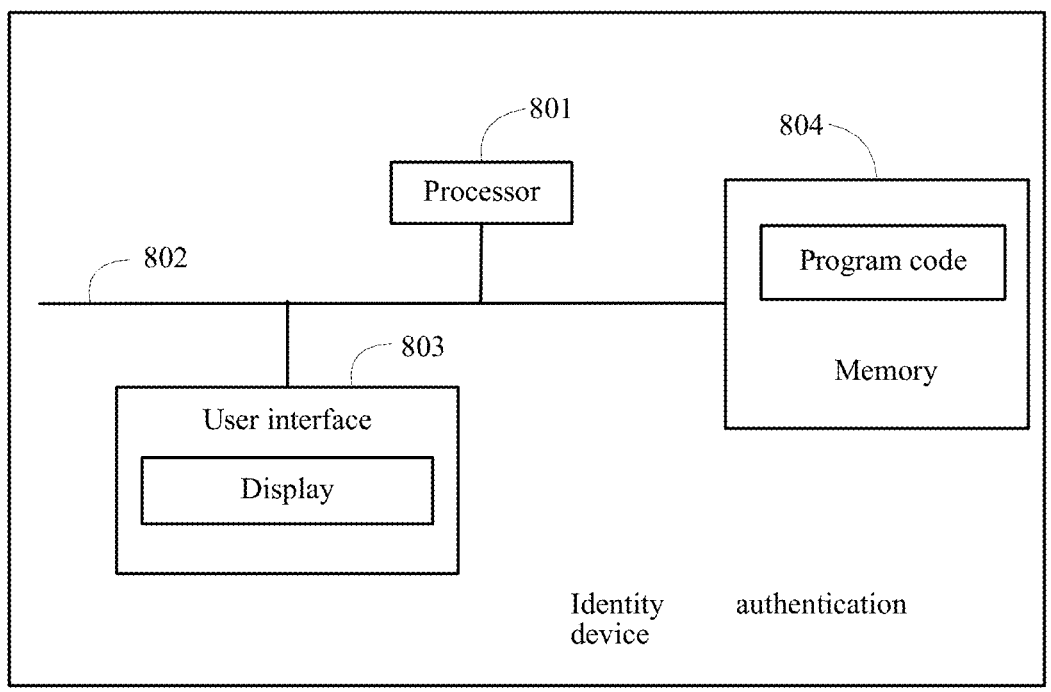
FIG. 8 is a schematic structural diagram of another exemplary voice imitation apparatus according to an embodiment of the present disclosure.

FIG. 8 is a schematic structural diagram of another exemplary voice imitation apparatus according to an embodiment of the present disclosure.

As shown in FIG. 8, the voice imitation apparatus may include at least one processor 801, such as a CPU, a user interface 803, a memory 804, and at least one communications bus 802. The communications bus 802 is configured to implement connection and communication between the components. The user interface 803 may include a display, and optionally, the user interface 803 may include a standard wired interface and a standard wireless interface. The memory 804 may be a high speed RAM memory or a non-volatile memory, for example, at least one magnetic disk memory. Optionally, the memory 804 may be at least one storage apparatus located remotely from the foregoing processor 801. The memory 804 stores a set of program code and the processor 801 calls the program code stored in the memory 804 to perform the following operations:

separately obtaining a training voice of a source user and training voices of a plurality of imitation users including a target user;

determining, according to the training voice of the source user and a training voice of the target user in the plurality of imitation users, a conversion rule for converting the training voice of the source user into the training voice of the target user;

collecting voice information of the source user; and converting the voice information of the source user into an imitation voice of the target user according to the determined conversion rule for converting the training voice of the source user into the training voice of the target user.

In an optional embodiment, the conversion rule includes a conversion matrix, and the processor 801 calls the program code stored in the memory 804 to perform the determining, according to the training voice of the source user and a training voice of a target user in the plurality of imitation users, a conversion rule for converting the training voice of the source user into the training voice of the target user, which may specifically include:

separately extracting a first feature parameter in the training voice of the source user and a second feature parameter in the training voice of the target user; and determining, according to the first feature parameter and the second feature parameter, a conversion matrix for converting the training voice of the source user into the training voice of the target user.

In an optional embodiment, the processor 801 calls the program code stored in the memory 804 to perform the converting the voice information of the source user into an imitation voice of the target user according to the determined conversion rule for converting the training voice of the source user into the training voice of the target user, which may specifically include:

extracting a third feature parameter in the voice information of the source user;

determining a fourth feature parameter in voice information of the target user according to the determined conversion matrix and the extracted third feature parameter; and performing synthesis to obtain an imitation voice of the target user according to the fourth feature parameter in the voice information of the target user.

In an optional embodiment, the fourth feature parameter includes bandwidths and frequencies of a plurality of formants, and the processor 801 calls the program code stored in the memory 804 to perform the performing synthesis to obtain an imitation voice of the target user according to the fourth feature parameter in the voice information of the target user, which may specifically include:

constructing a plurality of formant filters according to the bandwidths and frequencies of the plurality of formants in the voice information of the target user;

modulating, using the plurality of constructed formant filters, an excitation signal sent from a preset excitation source; and synthesizing the modulated excitation signal to obtain an imitation voice of the target user.

In an optional embodiment, after the processor 801 calls the program code stored in the memory 804 to perform the converting the voice information of the source user into an imitation voice of the target user according to the determined conversion rule for converting the training voice of the source user into the training voice of the target user, the processor 801 calls the program code stored in the memory 804 to further perform the following operations:

establishing a voice material library, where the voice material library includes imitation voices, obtained by conversion, of the plurality of imitation user; and uploading the voice material library to a cloud storage server to provide the voice material library to another user for performing voice imitation.

In an optional embodiment, after the processor 801 calls the program code stored in the memory 804 to perform the uploading the voice material library to a cloud storage server to provide the voice material library to another user for performing voice imitation, the processor 801 calls the program code stored in the memory 804 to further perform the following operations:

obtaining a recorded voice of the another user and imitation user information selected by the another user;

sending the recorded voice of the another user and the imitation user information to the cloud storage server, so as to enable the cloud storage server to determine, according to the imitation user information, a specified user among the plurality of imitation users and obtain an imitation voice of the specified user matching the recorded voice; and receiving the imitation voice of the specified user that matches the recorded voice and that is sent by the cloud storage server and playing the imitation voice.

It should be noted that, with regard to the foregoing method embodiments, for the purpose of simple description, the method embodiments are described as combinations of a series of actions, but a person skilled in the art should learn that the present disclosure is not limited by the described order of the actions, as some steps can, in accordance with the present disclosure, be performed in other orders or concurrently. Next, a person skilled in the art should also learn that, the embodiments described in the specification all fall within preferred embodiments, and the related actions and devices are not necessarily required by the present disclosure.

In the foregoing embodiments, description for each embodiment has its own emphasis, and a part without being described in detail in a particular embodiment can be learned by referring to relevant description in other embodiments.

A person of ordinary skill in the art may understand that all or some of the steps in the various methods of the foregoing embodiments may be implemented by a program instructing relevant hardware. The program may be stored in a computer readable storage medium. The storage medium may be a flash drive, a Read Only Memory (ROM), a Random Access Memory (RAM), a magnetic disk, an optical disc, or the like.

For example, one embodiment of present disclosure may include a non-transitory computer-readable storage medium containing computer-executable program instructions for, when executed by a processor, performing a voice imitation method. The method includes: separately obtaining a training voice of a source user and training voices of a plurality of imitation users including a target user; determining, according to the training voice of the source user and a training voice of the target user, a conversion rule for converting the training voice of the source user into the training voice of the target user; collecting voice information of the source user; and converting the voice information of the source user into an imitation voice of the target user according to the conversion rule.

Method, apparatus, and storage medium for voice imitation according to embodiments of the present invention are described herein. The principles and implementations of the present disclosure are described herein through specific examples. The description about the embodiments is merely provided for ease of understanding of concepts of the present disclosure. Meanwhile, a person of ordinary skill in the art can make variations to the present disclosure in terms of the specific implementations and application scopes according to the ideas of the present disclosure. Therefore, the content of the specification shall not be construed as a limit to the present disclosure.

What is claimed is:

1. A voice imitation method, comprising:
separately obtaining a training voice of a source user and training voices of a plurality of imitation users, wherein the plurality of imitation users include a target user;
determining, according to the training voice of the source user and a training voice of the target user, a conversion matrix for converting the training voice of the source user into the training voice of the target user, comprising:
separately extracting a first feature parameter in the training voice of the source user and a second feature parameter in the training voice of the target user, including: extracting bandwidths and frequencies of first N formants of a data frame of the training voice of the source user as the first feature parameter; and extracting bandwidths and frequencies of first N formants of the data frame of the training voice of the target user as the second feature parameter, N being an integer greater than 1;
separately performing dynamic time warping and vector quantization on the first feature parameter and the second feature parameter; and
determining, according to the first feature parameter and the second feature parameter after the dynamic time warping and the vector quantization are separately performed, the conversion matrix for converting the training voice of the source user into the training voice of the target user;
collecting voice information of the source user;
converting the voice information of the source user into an imitation voice of the target user according to the conversion matrix;
obtaining a recorded voice of another user and imitation user information selected by the another user;
sending the recorded voice of the another user and the imitation user information to a cloud storage server, to enable the cloud storage server to determine, according to the imitation user information and a voice material library comprising the imitation voices of the plurality of imitation users, a first specified user among the plurality of imitation users and obtain a first imitation voice of the first specified user matching the recorded voice;
receiving the first imitation voice of the first specified user that matches the recorded voice of the another user and that is sent by the cloud storage server and playing the first imitation voice, the first imitation voice of the first specified user reciting same content as the recorded voice of the another user; and
after playing the first imitation voice, based on a first operation of the another user, discarding the first imitation voice and re-obtaining a second imitation voice of a second specified user re-selected by the another user and matching the recorded voice; or based on a second operation of the another user, sending the first imitation voice of the first specified user to a contact in an instant messaging communication.

2. The method according to claim 1, wherein converting the voice information of the source user into the imitation voice of the target user comprises:
extracting a third feature parameter in the voice information of the source user;
determining a fourth feature parameter in voice information of the target user according to the determined conversion matrix and the extracted third feature parameter; and
performing a synthesis to obtain the imitation voice of the target user according to the fourth feature parameter in the voice information of the target user.

3. The method according to claim 2, wherein: the fourth feature parameter comprises bandwidths and frequencies of a plurality of formants in the voice information of the target user, and performing the synthesis to obtain the imitation voice of the target user according to the fourth feature parameter in the voice information of the target user comprises:
constructing a plurality of formant filters according to the bandwidths and the frequencies of the plurality of formants in the voice information of the target user;
modulating, via the plurality of constructed formant filters, an excitation signal sent from a preset excitation source; and
synthesizing the modulated excitation signal to obtain an imitation voice of the target user.

4. The method according to claim 1, wherein, after converting the voice information of the source user into the imitation voice of the target user, the method further comprises:
establishing the voice material library, comprising the imitation voices, obtained by conversion, of the plurality of imitation users; and
uploading the voice material library to the cloud storage server to provide the voice material library to the another user for performing voice imitation.

5. A voice imitation apparatus, comprising:
a memory, storing program instructions for a voice imitation method, and
a processor, coupled to the memory and, when executing the program instructions, configured to:
separately obtain a training voice of a source user and training voices of a plurality of imitation users including a target user;
determine, according to the training voice of the source user and a training voice of the target user, a conversion matrix for converting the training voice of the source user into the training voice of the target user, comprising:
separately extracting a first feature parameter in the training voice of the source user and a second feature parameter in the training voice of the target user, including: extracting bandwidths and frequencies of first N formants of a data frame of the training voice of the source user as the first feature parameter; and extracting bandwidths and frequencies of first N formants of the data frame of the training voice of the target user as the second feature parameter, N being an integer greater than 1;

separately performing dynamic time warping and vector quantization on the first feature parameter and the second feature parameter; and determining, according to the first feature parameter and the second feature parameter after the dynamic time warping and the vector quantization are separately performed, the conversion matrix for converting the training voice of the source user into the training voice of the target user;

collect voice information of the source user;

convert the voice information of the source user into an imitation voice of the target user according to the conversion matrix;

obtain a recorded voice of another user and imitation user information selected by the another user;

send the recorded voice of the another user and the imitation user information to a cloud storage server, to enable the cloud storage server to determine, according to the imitation user information and a voice material library comprising the imitation voices of the plurality of imitation users, a first specified user among the plurality of imitation users and obtain a first imitation voice of the first specified user matching the recorded voice;

receive the first imitation voice of the first specified user that matches the recorded voice of the another user and that is sent by the cloud storage server and playing the first imitation voice, the first imitation voice of the first specified user reciting same content as the recorded voice of the another user; and after playing the first imitation voice, based on a first operation of the another user, discard the first imitation voice and re-obtaining a second imitation voice of a second specified user re-selected by the another user and matching the recorded voice;

or based on a second operation of the another user, send the first imitation voice of the first specified user to a contact in an instant messaging communication.

6. The apparatus according to claim 5, wherein the processor is further configured to:

extract a third feature parameter in the voice information of the source user;

determine a fourth feature parameter in voice information of the target user according to the determined conversion matrix and the extracted third feature parameter; and perform a synthesis to obtain the imitation voice of the target user according to the fourth feature parameter in the voice information of the target user.

7. The apparatus according to claim 6, wherein:

the fourth feature parameter comprises bandwidths and frequencies of a plurality of formants in the voice information of the target user, and the processor is further configured to:

construct a plurality of formant filters according to the bandwidths and the frequencies of the plurality of formants in the voice information of the target user;

modulate, via the plurality of constructed formant filters, an excitation signal sent from a preset excitation source; and synthesize the modulated excitation signal to obtain an imitation voice of the target user.

8. The apparatus according to claim 5, wherein the processor is further configured to:

establish the voice material library, comprising the imitation voices, obtained by conversion, of the plurality of imitation users; and upload the voice material library to the cloud storage server to provide the voice material library to the another user for performing voice imitation.

9. A non-transitory computer-readable storage medium containing computer-executable program instructions for, when executed by a processor, performing a voice imitation method, the method comprising:

separately obtaining a training voice of a source user and training voices of a plurality of imitation users, wherein the plurality of imitation users include a target user;

determining, according to the training voice of the source user and a training voice of the target user, a conversion matrix for converting the training voice of the source user into the training voice of the target user, comprising:

separately extracting a first feature parameter in the training voice of the source user and a second feature parameter in the training voice of the target user, including: extracting bandwidths and frequencies of first N formants of a data frame of the training voice of the source user as the first feature parameter; and extracting bandwidths and frequencies of first N formants of the data frame of the training voice of the target user as the second feature parameter, N being an integer greater than 1;

separately performing dynamic time warping and vector quantization on the first feature parameter and the second feature parameter; and determining, according to the first feature parameter and the second feature parameter after the dynamic time warping and the vector quantization are separately performed, the conversion matrix for converting the training voice of the source user into the training voice of the target user;

collecting voice information of the source user;

converting the voice information of the source user into an imitation voice of the target user according to the conversion matrix;

obtaining a recorded voice of another user and imitation user information selected by the another user;

sending the recorded voice of the another user and the imitation user information to a cloud storage server, to enable the cloud storage server to determine, according to the imitation user information and a voice material library comprising the imitation voices of the plurality of imitation users, a first specified user among the plurality of imitation users and obtain a first imitation voice of the first specified user matching the recorded voice;

receiving the first imitation voice of the first specified user that matches the recorded voice of the another user and that is sent by the cloud storage server and playing the first imitation voice, the first imitation voice of the first specified user reciting same content as the recorded voice of the another user; and after playing the first imitation voice, based on a first operation of the another user, discarding the first imitation voice and re-obtaining a second imitation voice of a second specified user re-selected by the another user and matching the recorded voice; or based on a second operation of the another user, sending the first imitation voice of the first specified user to a contact in an instant messaging communication.

10. The storage medium according to claim 9, wherein converting the voice information of the source user into the imitation voice of the target user comprises:
- extracting a third feature parameter in the voice information of the source user;
- determining a fourth feature parameter in voice information of the target user according to the determined conversion matrix and the extracted third feature parameter; and
- performing a synthesis to obtain the imitation voice of the target user according to the fourth feature parameter in the voice information of the target user.

11. The storage medium according to claim 10, wherein:
the fourth feature parameter comprises bandwidths and frequencies of a plurality of formants in the voice information of the target user, and
performing the synthesis to obtain the imitation voice of the target user according to the fourth feature parameter in the voice information of the target user comprises:
- constructing a plurality of formant filters according to the bandwidths and the frequencies of the plurality of formants in the voice information of the target user;
- modulating, via the plurality of constructed formant filters, an excitation signal sent from a preset excitation source; and
- synthesizing the modulated excitation signal to obtain an imitation voice of the target user.

12. The storage medium according to claim 9, wherein, after converting the voice information of the source user into the imitation voice of the target user, the method further comprises:
- establishing the voice material library, comprising the imitation voices, obtained by conversion, of the plurality of imitation users; and
- uploading the voice material library to the cloud storage server to provide the voice material library to the another user for performing voice imitation.

* * * * *